Patented June 27, 1933 1,915,570

UNITED STATES PATENT OFFICE

HENRY DREYFUS, OF LONDON, ENGLAND

MANUFACTURE OF ALIPHATIC ANHYDRIDES

No Drawing. Application filed March 8, 1929, Serial No. 345,443, and in Great Britain March 21, 1928.

This invention relaates to the manufacture of aliphatic anhydrides from aliphatic acids, and especially to the manufacture of acetic anhydride from acetic acid.

In my previous United States Patent No. 1,735,962 granted November 19, 1929, I have described how acetic anhydride may be produced by thermally decomposing acetic acid vapour in presence of one or more phosphoric acids. The present application is a continuation in part of the application on which said patent was granted.

According to the present invention I have now found that aliphatic anhydrides may be produced in an especially satisfactory manner by passing vapours of an aliphatic acid over or otherwise in contact with a heated catalyst mass consisting of one or more phosphoric acids supported upon, i. e. spread upon or mixed with, a carrier composed of carbon, charcoal or Carborundum.

In performing the invention I may employ any phosphoric acid, or mixtures of two or more phosphoric acids, for instance, orthophosphoric acid, pyrophosphoric acid or one or more metaphosphoric acids or mixtures of any of such acids. The phosphoric acid or acids may be spread upon or mixed with the carrier in any suitable way. For example, where carbon or charcoal is employed as the carrier in conjunction with a metaphosphoric acid, the mixture may conveniently be prepared by igniting (within which term I include carbonizing) a mixture of orthophosphoric acid and an organic substance such for instance as cane sugar. Or, for example, in cases where a pyro or metaphosphoric acid is to be employed, spread upon or mixed with Carborundum, the catalyst mass may conveniently be prepared by mixing with or spreading upon the Carborundum and subsequently heating, a substance (such for instance as an orthophosphoric acid or ammonium phosphate) capable of yielding a meta or pyrophosphoric acid on heating.

The thermal decomposition of the aliphatic acid vapour may be performed at temperatures of from about 300° to 600° C. and preferably at temperatures of from 400° to 500° C.

In performing the invention I may pass the acetic or other aliphatic acid vapour in a stream through suitable metal or other tubes or other form of apparatus containing the catalyst mass, said tubes or apparatus or the catalyst being heated to the desired temperature electrically or by any other suitable means. I preferably employ tubes or apparatus made of or lined with gold, platinum or like inert metals in order to avoid, as far as possible, attack of the catalyst on the apparatus and deposition of metallic or other inhibiting impurities on the catalyst mass.

The catalyst mass may, if desired, be regenerated continuously with the reaction; for example, it may be caused to circulate continuously from the reaction through a regeneration zone and then returned to the reaction zone. The regeneration may be effected by heating the catalyst mass to remove water bound or absorbed thereby.

It will be understood that I do not limit myself as to the pressure to be employed in the thermal decomposition of the aliphatic acid vapour, as the process may be performed under ordinary atmospheric pressure, or under reduced pressure or "vacuum", or under pressures higher than atmospheric.

The reaction vapours resulting from the thermal decomposition of the aliphatic acid may be subjected to any suitable treatment for separating the anhydride from the water present or formed in the reaction.

For instance, the gases or vapours from the reaction zone may be subjected to fractional condensation, for example by leading them up through one or more fractionating columns maintained at a temperature or temperatures intermediate between the boiling points (under the conditions of pressure obtaining) of the anhydride and of water, whereby the anhydride is condensed and the water passes on in vapour form.

Or, for instance, the reaction vapours may be passed through one or more solvents for the anhydride which are insoluble or substantially insoluble in water and of higher boiling point than water (preferably of higher boiling point than the anhydride), such solvents being employed at temperatures intermediate between the boiling points (under the conditions of pressure obtaining) of water and of the anhydride, whereby the anhydride is condensed or absorbed and the water escapes in vapour form. As examples of such solvents may be mentioned chlorbenzene, paradichlorbenzene, benzylether, tetrachlorethane, paraffin oil, triacetin, phenetol, anisol, one or more cresols, and paracresyl acetate.

Or, for instance, the reaction vapours may be subjected to the separation treatment described in U. S. patent application of myself and C. I. Haney S. No. 284,566 filed 11 June, 1928, that is to say the anhydride may be condensed from the reaction vapours whilst carrying away the water vapour by the vapour of one or more entraining liquids. In such form of execution the reaction vapours are preferably mixed, after leaving the reaction zone, with the vapours of the entraining liquid or liquids at a temperature below the boiling point (under the conditions of pressure obtaining) of the anhydride. Conveniently such mixing may be performed by introducing the reaction vapours (which should not be allowed to cool below the boiling point of water before becoming mixed with the vapours of the entraining liquid or liquids) into a vessel up which the vapours of the entraining liquid or liquids are caused to rise; by this means the anhydride may be substantially condensed and the water vapour carried away with the vapours of the entraining liquid or liquids. Examples of entraining liquids which I may use for such method of condensation are benzene, carbon tetrachloride, petrol, mixtures of two or more of such bodies, or mixtures of ether with petroleum ether; it will be understood, however that any other liquids chemically inert to the anhydride and having a high entraining capacity for water may be employed. The liquids should preferably have a low entraining capacity for the anhydride.

Or, for instance, the reaction vapours may be subjected to the separation treatment described in United States patent application of myself and C. I. Haney S. No. 285,613 filed 15 June, 1928, that is to say they may be subjected to separation by leading them under the surface of an "extracting" liquid cooled down or otherwise kept at temperatures below (and preferably considerably below) the boiling point of water. By such means the anhydride is separated from the water in a highly efficient manner. By the term "extracting" liquid is meant a liquid or liquid mixture which is chemically inert to the anhydride and insoluble or substantially insoluble in water. As examples of such "extracting" liquids may be mentioned benzene, chloroform and mixtures of ethyl ether or chloroform with one or more hydrocarbons such as light paraffins, gasoline, kerosene, benzol, or its homologues. It is preferable to use as "extracting" liquids, liquids of the character referred to which are themselves hydrocarbons or which contain hydrocarbons, for example benzene or mixtures of ethyl ether or chloroform with one or more hydrocarbons such as paraffins (particularly the petroleum fraction of boiling point 40° to 70° C. termed petroleum ether), gasoline (boiling points 70° to 90° C.), kerosene, benzol or its homologues. The following particular examples of "extracting" liquids are very suitable:—ether in admixture with petroleum ether, chloroform mixed with petroleum ether and/or gasoline; and mixtures of ether and petroleum ether containing about 30 to 50% petroleum ether are especially suitable.

Or, for instance, the reaction vapours may be treated by the process described in my United States patent application S. No. 242,977 filed 27 December, 1927, that is to say they may be passed over or otherwise in contact with one or more "water binding" substances maintained at a temperature or temperatures below (and preferably substantially below) the temperature at which the reaction vapours are produced. By such treatment the water vapour may be substantially absorbed from the reaction vapours. In such treatment the water binding substances are preferably maintained at temperatures above the boiling point (under the conditions of pressure obtaining) of water, to avoid condensation of water and the resulting risk of loss of anhydride through hydrolysis, and for the best functioning of the treatment the water binding substances should be employed at temperatures above the boiling point of the anhydride, in which case the water can be substantially absorbed and the anhydride pass on in vapour form. The term "water binding" substances means bisulphates, pyrosulphates, (especially bisulphates and pyrosulphates of the alkali and earth alkali metals), zinc chloride, calcium chloride, orthophosphoric acid, pyrophosphoric acid, metaphosphoric acid and like substances which have affinity (and preferably high affinity) for water, but excluding substances having a deleterious effect on aliphatic acids or anhydrides, such as sulphuric acid.

It will of course be understood that in cases where the thermal decomposition of aliphatic acid vapour is performed under pressures higher than atmospheric, the reaction gases or vapours should, prior to treatment for separation or recovery of the anhydride, preferably be passed through suitable apparatus (e. g. one or more reducing valves) wherein the pressure is reduced substantially to normal atmospheric pressure.

The anhydride separated or recovered from the reaction gases or vapours may, if desired or required, be purified by any suitable means. For instance, it may be distilled from anhydrous sodium or other acetate to recover the anhydride in as pure a form as possible.

It will be understood that the invention is not limited as to the strength of aliphatic acid employed. The process can be performed even with the vapours of dilute acids; and besides affording a ready means for the manufacture of anhydrides from concentrated or highly concentrated acids, it affords valuable means for producing anhydrides from waste or dilute acids, especially waste or dilute acids such as result from the acetylation of cellulose or other industrial acetylation processes.

Further, the invention, besides affording a ready means for producing acetic anhydride, enables anhydrides of other monobasic aliphatic acids (e. g. propionic or butyric acid) to be produced in a highly satisfactory manner.

The following examples serve to illustrate some forms of the invention, it being understood that they are given only by way of illustration and are in no way limitative.

*Example 1*

A catalyst mass is prepared by igniting or charring in any suitable manner a mixture of can sugar and orthophosphoric acid. The resulting catalyst mass is placed in a tube (preferably a tube made of or lined with gold or platinum). Acetic acid vapour, produced from glacial acetic acid is passed in a rapid stream through the tube which is heated to a temperature between 450° and 500° C., and the reaction gases are subjected to fractional condensation by leading them upwards through one or more fractionating columns maintained at temperatures intermediate between the boiling points of anhydride and water, whereby the anhydride is condensed whilst allowing the water to escape in vapour form.

*Example 2*

A catalyst mass is prepared by heating a mixture of Carborundum and orthophosphoric acid in any suitable manner to convert the orthophosphoric acid to metaphosphoric acid. The resulting catalyst mass is placed in a tube (e. g. a tube made of or lined with gold or platinum). Acetic acid vapour, produced by boiling glacial acetic acid, is passed in a rapid stream through the tube, which is heated to a temperature between 450° and 500° C. The anhydride so produced is separated from the reaction gases in the manner described in Example 1.

*Example 3*

Vapours produced by boiling pure propionic acid are passed in a rapid stream through a tube composed of or lined with gold or platinum and containing the catalyst mass described in Example 1 or Example 2, the tube being heated to a temperature between 450° and 500° C.

What I claim and desire to secure by Letters Patent is:—

1. Process for the manufacture of an aliphatic anhydride which comprises subjecting the vapor of an aliphatic acid to thermal decomposition by passing the vapor of an aliphatic acid in contact with a heated catalyst mass comprising at least one phosphoric acid supported upon a carrier selected from the group consisting of carbon and Carborundum.

2. Process for the manufacture of acetic anhydride which comprises subjecting acetic acid vapor to thermal decomposition by passing said vapor in contact with a heated catalyst mass comprising at least one phosphoric acid supported upon a carrier selected from the group consisting of carbon and Carborundum.

3. Process for the manufacture of an aliphatic anhydride which comprises subjecting the vapor of an aliphatic acid to thermal decomposition by passing the vapor of an aliphatic acid in contact with a heated catalyst mass comprising metaphosphoric acid supported upon a carrier selected from the group consisting of carbon and Carborundum.

4. Process for the manufacture of acetic anhydride which comprises subjecting acetic acid vapor to thermal decomposition by passing said vapor in contact with a heated catalyst mass comprising metaphosphoric acid supported upon a carrier selected from the group consisting of carbon and Carborundum.

5. Process for the manufacture of an aliphatic anhydride which comprises subjecting the vapor of an aliphatic acid to thermal decomposition by passing the vapor of an aliphatic acid in contact with a heated catalyst mass comprising at least one phosphoric acid supported upon a carrier composed of charcoal.

6. Process for the manufacture of acetic anhydride which comprises subjecting acetic acid vapor to thermal decomposition by passing said vapor in contact with a heated catalyst mass comprising at least one phosphoric acid supported upon a carrier composed of charcoal.

7. Process according to claim 1 and wherein the reaction is performed at a temperature between 300° and 600° C.

8. Process for the manufacture of an aliphatic anhydride which comprises subjecting the vapor of an aliphatic acid to thermal decomposition by passing the vapor of an aliphatic acid in contact with a heated catalyst mass comprising metaphosphoric acid supported upon charcoal.

9. Process for the manufacture of an aliphatic anhydride which comprises subjecting the vapor of an aliphatic acid to thermal decomposition by passing the vapor of an aliphatic acid in contact with a heated catalyst mass composed of metaphosphoric acid and charcoal produced by igniting a mixture of orthophosphoric acid and a solid organic carbonizable substance containing no inorganic substituent groups.

10. Process for the manufacture of an aliphatic anhydride which comprises subjecting the vapor of an aliphatic acid to thermal decomposition by passing the vapor of an aliphatic acid in contact with a heated catalyst mass composed of metaphosphoric acid and charcoal produced by igniting a mixture of orthophosphoric acid and cane sugar.

11. Process for the manufacture of acetic anhydride which comprises subjecting acetic acid vapor to thermal decomposition by passing said vapor in contact with a heated catalyst mass composed of metaphosphoric acid and charcoal produced by igniting a mixture of orthophosphoric acid and a solid organic carbonizable substance containing no inorganic substituent groups.

12. Process for the manufacture of an aliphatic anhydride which comprises subjecting the vapor of an aliphatic acid to thermal decomposition at a temperature between 300° and 600° C. by passing the vapor of an aliphatic acid in contact with a heated catalyst mass composed of metaphosphoric acid and charcoal produced by igniting a mixture of orthophosphoric acid and cane sugar.

13. A process for the manufacture of acetic anhydride which comprises subjecting acetic acid vapor to thermal decomposition at a temperature between 300° and 600° C. by passing said vapor in contact with a heated catalyst mass composed of metaphosphoric acid and charcoal produced by igniting a mixture of orthophosphoric acid and a solid organic carbonizable substance containing no inorganic substituent groups.

In testimony whereof I have hereunto subscribed my name.

HENRY DREYFUS.